(12) United States Patent
Sullivan

(10) Patent No.: US 6,825,977 B2
(45) Date of Patent: Nov. 30, 2004

(54) FIXTURE FOR MICROSCOPE COMPONENT ALIGNMENT

(75) Inventor: Neal T. Sullivan, Lunenberg, MA (US)

(73) Assignee: Soluris Inc., Concord, MA (US)

( * ) Notice: Subject to any disclaimer, the term of this patent is extended or adjusted under 35 U.S.C. 154(b) by 165 days.

(21) Appl. No.: 10/163,917

(22) Filed: Jun. 6, 2002

(65) Prior Publication Data

US 2003/0227671 A1 Dec. 11, 2003

(51) Int. Cl.[7] .......................... G02B 21/00; G01B 11/06
(52) U.S. Cl. .................... 359/368; 359/363; 356/153
(58) Field of Search ............................. 359/362–363, 359/368–390, 808–830; 356/153, 172, 399–401; 355/52–64

(56) References Cited

U.S. PATENT DOCUMENTS

| | | | | |
|---|---|---|---|---|
| 4,335,313 A | * | 6/1982 | Kreuzer et al. | 378/34 |
| 4,766,309 A | * | 8/1988 | Kudo | 250/237 R |
| 4,772,123 A | * | 9/1988 | Radner | 356/153 |
| 6,025,908 A | * | 2/2000 | Houde-Walter | 356/153 |
| 6,525,802 B1 | * | 2/2003 | Novak | 355/53 |

* cited by examiner

Primary Examiner—Thong Q Nguyen
(74) Attorney, Agent, or Firm—Cohen, Pontani, Lieberman & Pavane

(57) ABSTRACT

A fixture and method is provided for aligning optical elements in a microscope. The fixture attaches to an objective lens plane of the microscope and supports an alignment optical element. During optical component alignment, an alignment beam is directed along the illumination and imaging paths of the microscope through the objective lens port and into the fixture for reflection by the alignment optical element. The fixture allows an alignment optical element positioned in a single location to be used for aligning the microscope components and for adjusting the microscope objective lens.

22 Claims, 3 Drawing Sheets

FIXTURE FOR MICROSCOPE COMPONENT ALIGNMENT

BACKGROUND OF THE INVENTION

1. Field of the Invention

This invention is directed to microscope optical component adjustment and, more particularly, to a device and method for assisting in the alignment of optical components in a microscope.

2. Description of the Related Art

A prior art optical microscope 10 is shown in FIG 1. The microscope contains a housing 12 which defines two optical paths; an illumination path 14 and an imaging path 16. The illumination path provides light to an objective lens 18 proximate a sample plane 22 containing a sample (not shown), and the imaging path 16 directs the image of the sample obtained by the objective lens 18 to an output port 31 containing, for example, an eyepiece, camera, or other capturing device 36. Disposed along the illumination path 14 are illumination components such as a set of lenses 24 and a set of apertures 26, and the imaging path 16 also contains a set of apertures 30 and a set of lenses 31. As shown, both paths converge on, or overlap to share, a common path region containing one or more optical elements including a beam splitter 34. The beam splitter directs the illumination light to the objective lens 18 and passes the resulting image to the output port 32 for processing, for example, by camera 36.

During microscope assembly as well as during microscope maintenance, the optical components must be aligned along their respective path positions relative to each other and relative to the sample plane 22 to insure proper microscope operation. The alignment and adjustment process is performed independently on each optical path with the use of an alignment telescope 29, which is typically first positioned at the illumination path input port 28 for directing a generated reference light beam along the illumination path 14 to the objective lens port 38 on the objective lens plane 20 defined on a surface of housing 12, i.e. to the plane where the objective lens mounts. The term "objective lens plane" is used herein to refer to a surface where the objective lens connects to the housing 12 and also defines a reference surface for an optical alignment target component. The objective lens 18 will not yet be in position in the lens port, as this positioning is typically performed after optical component alignment has been substantially completed. Instead, a target planar mirror having a cross-hair target (not shown) is placed in the objective lens port 38 for reflecting the reference light back through the illumination path 14 to the alignment telescope 29. Using the reflected light as a guide, the illumination path optical components are inserted on an element-by-element basis and manually manipulated for alignment along the illumination path 14.

Once alignment of the illumination path optical components is substantially complete, the alignment telescope is positioned at the imaging path output port 32 for directing the reference light to the target mirror along the imaging path 16. The imaging path optical components can then be installed on an element-by-element basis and aligned with respect to the target planar mirror position (i.e., at the objective lens port 38), such as by manual manipulation of the individual components. Thereafter, the objective lens 18 is substituted for the target mirror and is adjusted for tilt angle and centration with respect to a target sample (not shown) positioned on the sample plane 22. Once the objective lens 18 is adjusted, readjustment of the optical components in the illumination and imaging paths may be necessary for fine-tuning the alignment of those components.

A drawback of the prior art alignment technique discussed above is that the location of the target mirror at the sample plane—which is used for adjustment of the objective lens—is different than the location of the target mirror at the objective lens port, i.e. the location used to align the illumination path and imaging path optical components. This not only requires adjustment of the objective lens after alignment of these other optical components but, the use of a different target location as a reference for the objective lens requires further fine-tuning, i.e. realignment and readjustment of the optical path components once the objective lens adjustment is completed. Thus, the alignment telescope 29 would be repositioned at the illumination path input port 28 for fine-tuning the illumination path optical components, and then repositioned at the imaging path port 32 for fine-tuning the imaging path optical components. Such a process is tedious and time consuming. Also, it may not be possible to know for certain which component is responsible for the misalignment, so a repetitive sequence of steps is required.

SUMMARY OF THE INVENTION

The aforementioned deficiencies of the prior art are overcome by providing a fixture configured for mounting to an objective lens plane of an optical microscope. The fixture includes a base having a mounting surface and an elongated wall or arm having an inner surface. The wall has at least one optical element reference mount for providing removable placement of a reference optical element along an optical path of the microscope. The fixture provides for alignment and adjustment of the microscope optical components, including an objective lens, relative to the reference optical element by positioning the reference optical element at a fixed distance from, and aligned with, the objective lens plane.

In one embodiment, the fixture contains multiple spaced apart mounts for accommodating varying types of reference optical elements for use in alignment techniques.

In another embodiment, a method of aligning optical components in a microscope is provided wherein a fixture having a base and a wall is positioned at an objective lens port of the microscope. An alignment beam is generated and is directed toward the objective lens port through the fixture base. A reference optical element is disposed within a path of the alignment beam for reflecting the alignment beam toward the alignment beam source. The reflected alignment beam is then used to align the optical components in the microscope relative to the reflected alignment beam.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements through the several views.

DETAILED DESCRIPTION OF THE PRESENTLY PREFERRED EMBODIMENTS

Figure 1:
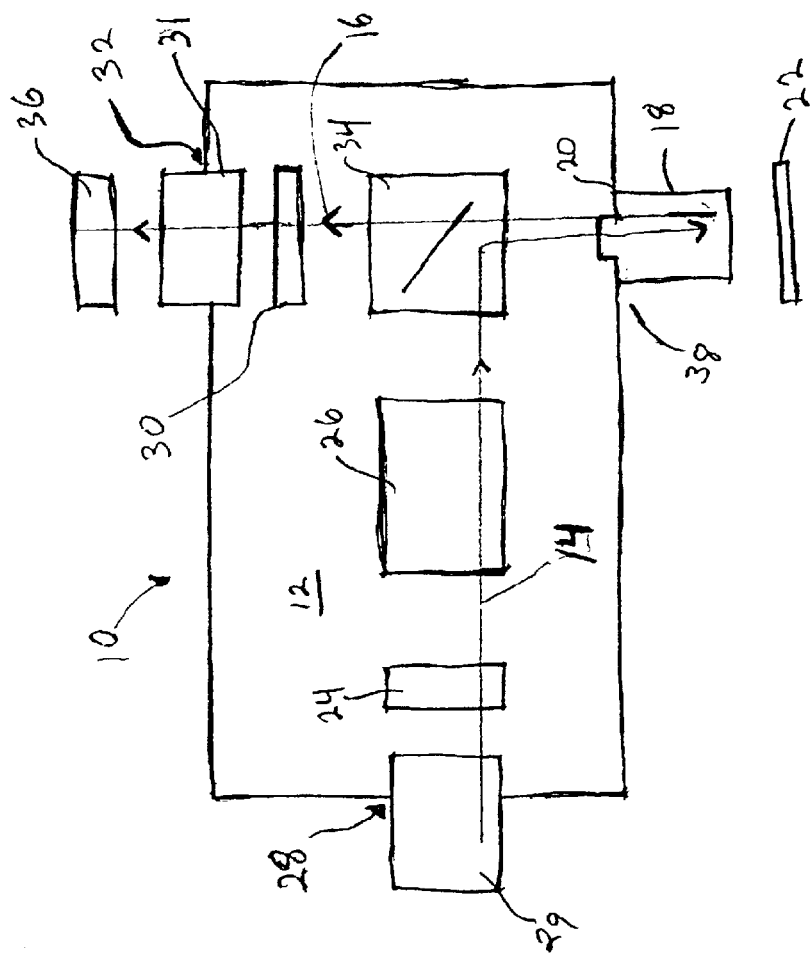
FIG. 1 is a schematic depiction of a prior art microscope.
Figure 2:
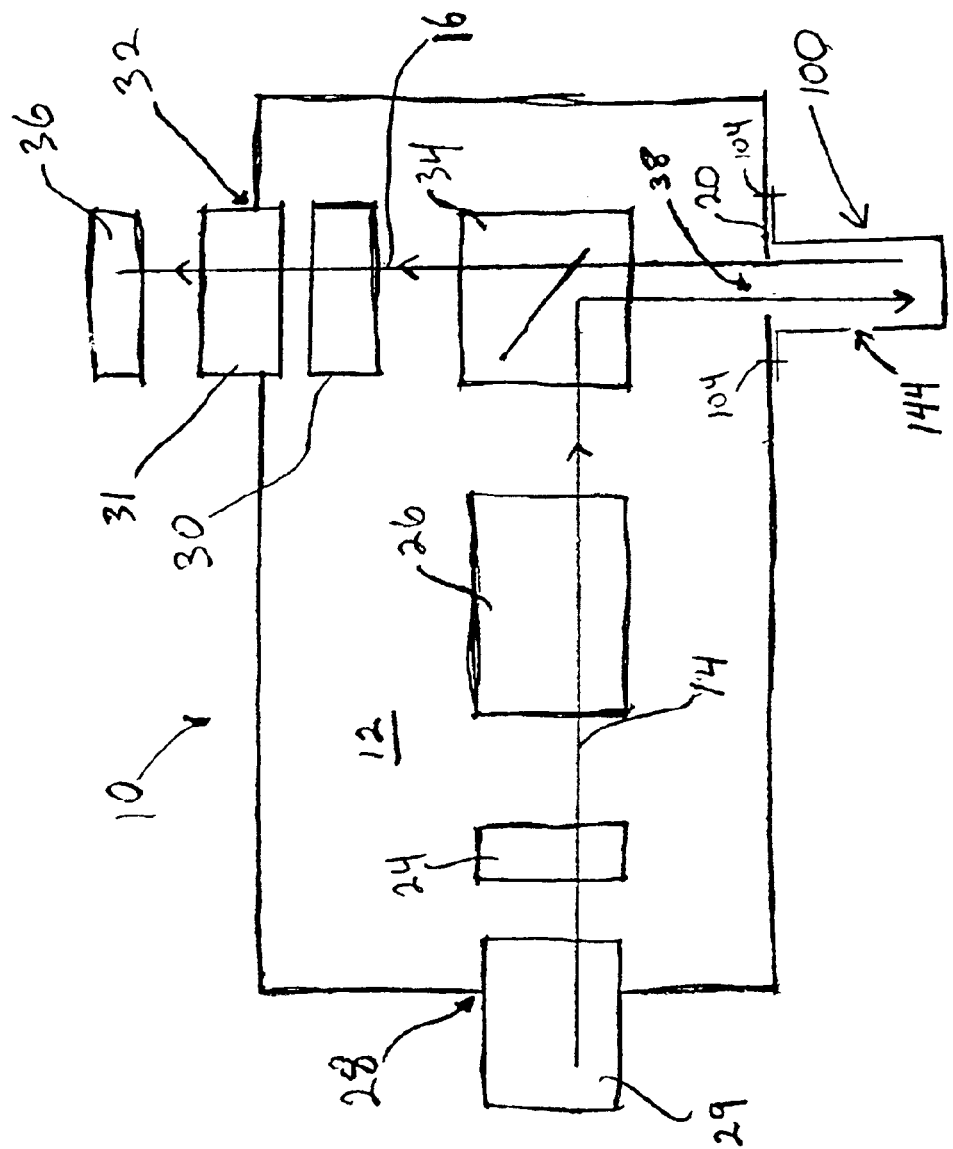
FIG. 2 is a schematic depiction of a microscope with a fixture of the present invention mounted thereto.
Figure 3:
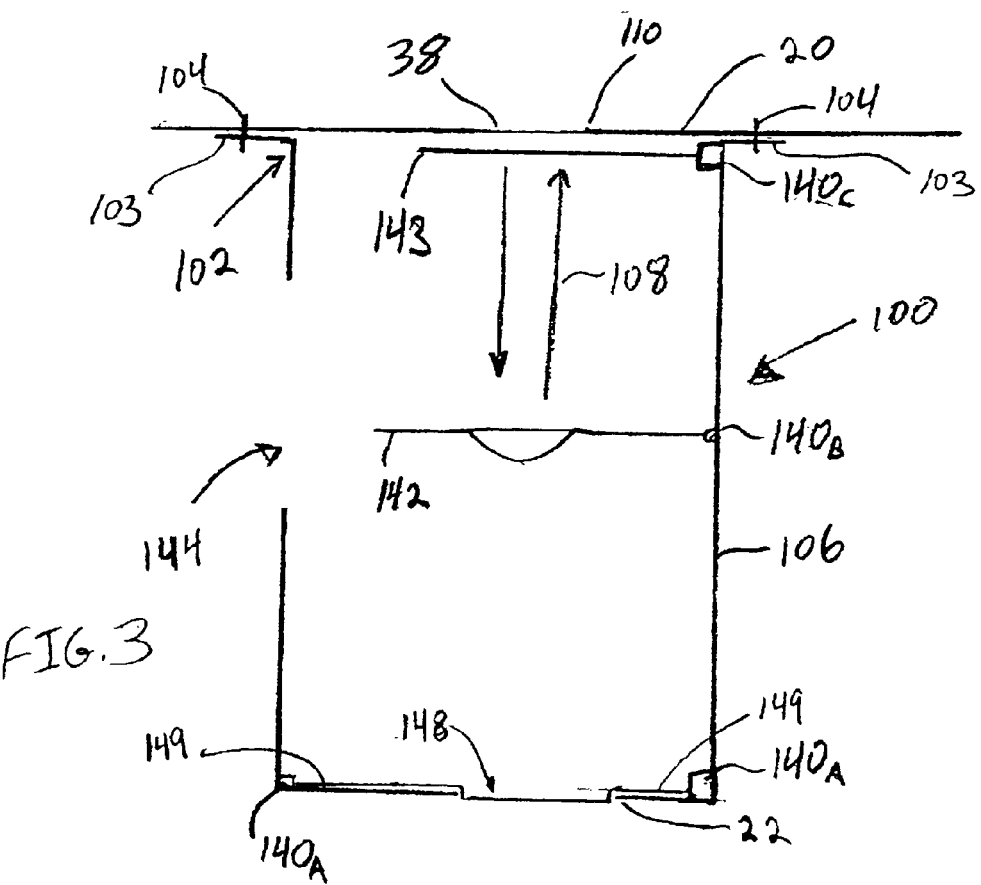
FIG. 3 depicts a cross-sectional side view of the fixture of FIG. 2 in accordance with one embodiment of the present invention.

With reference to the drawings and, in particular, to FIGS. 2 and 3, a fixture 100 is provided that is releasably attachable to a microscope 10. The fixture 100 has a base or coupling end 102 which is configured for detachable alignment about the microscope objective lens port 38 on objective lens plane 20. The fixture 100 functions as an alignment reference tool to assist an assembler or technician of the microscope with the alignment of the various microscope optical components, including the objective lens, relative to a common alignment target positioned at a common reference location and allows for repositioning of the target within the fixture 100. The fixture permits the microscope optical components, including the objective lens, to be aligned with respect to a common reference location, thereby improving alignment accuracy and decreasing the alignment and set-up time of the optical microscope.

With continued reference to FIG. 3, the fixture base 102 is configured with shoulders 103 which abut the objective lens plane 20, and includes screw holes for accommodating thumb screws 104 to releasably secure the fixture to screw holes (not shown) in the microscope objective lens plane 20 to position the fixture 100 in alignment with the objective lens port 38. To provide alignment flexibility, the thumb screws not only allow for lateral adjustment but preferably also allow for tilt angle adjustment of the fixture 100 about the objective lens plane 20.

As shown in FIGS. 2 and 3, the fixture 100 includes a wall or arm member 106 attached to the base 102 and extending away from the objective lens plane 20. One or more reference optical mounts 140 are supported on an inner surface of the wall member 106 to support one or more reference elements, such as a planar mirror 148, a spherical mirror 142, a star target reticle 143, etc. The mounts 140 allow the reference elements to be inserted into and removed from the path of light transmitted through the fixture, e.g. the alignment telescope light, etc., to provide a light signal for use in microscope component alignment, as discussed more fully below.

As an alternative to the thumb screw and shoulder configuration of FIG. 3, the fixture 100 may engage the microscope 10 about the objective lens port 38 such as by complementary threading (not shown) on the fixture base and on the objective lens plane. The threading is preferably concentrically aligned with threading in the objective lens port 38 and spaced therefrom to provide for attachment and detachment of the fixture 100 to the microscope 10 without interfering with the objective lens port 38. This allows for the objective lens to be inserted into the objective lens port 38 with the fixture 100 mounted to the microscope 10 and allows for the fixture to be thereafter removed without disrupting the objective lens. Still other attachment/detachment configurations and techniques may be readily employed by those of ordinary skill without departing from the scope of the invention.

The base 102 and wall member 106 may be molded separately and attached to each other in any known manner or, preferably, integrally formed from one or more of a variety of suitable rigid materials, such as plastics or metals. The wall member 106 is preferably dimensioned to have a length equal to or closely approximating the distance between the objective lens plane 20 and the microscope sample plane 22 to provide for the positioning of a reference optical element (e.g., the planar mirror 148) at or proximate the sample plane 22. Also as shown in FIG. 3, the wall member 106 may contain an opening 144 to provide access to the reference elements (e.g. mirror 148) located within a housing defined at least in part by the base 102 and wall member 106.

In operation, a technician attaches the fixture 100 to the objective lens plane 20 via, for example, use of the thumb screws 104 and cooperative elements in housing 10 (as in FIG. 3), or by threading about the objective lens port 38. A desired reference optical element would then be inserted into an appropriate reference optical mount 140 in any known manner, for example, via access through opening 144, such as by a friction or snap fit engagement between an edge 149 of the reference element 148 and the optical mount $140_A$ or by slidable engagement therewith. As should be appreciated by those having ordinary skill in the art, various types of mounts 140 may be used to removably secure the reference elements in their desired position. As should also be appreciated, the desired reference optical element may be in place in the fixture prior to attachment of the fixture to the microscope 10.

During an alignment procedure, and as explained above, a reference optical element is inserted into the fixture 100 at a desired position. For example, the planar mirror 148 may be inserted into optical mounts $140_A$ located proximate the microscope sample plane 22 for reflecting light received from and back through the objective lens port 38 (shown in FIG. 3 as optical path 108). Specifically, the periphery 149 of the mirror 148 engages the mounts $140_A$. When used in this manner, the objective lens may or may not be attached to the objective lens mount 110. The size of fixture 100 is sufficiently large to seat on the objective lens plane with the objective lens in place. In either case, and as explained above, an alignment telescope will be used for projecting an alignment beam through the input port 28 along the illumination path 14 whereupon the alignment beam will be deflected by the beam splitter 34 through the objective lens port 38 to the reference optical planar mirror 148. The light is then reflected back along the illumination path so that alignment of the illumination optical components can be established with respect to the microscope sample plane 22 positioned within the fixture and relative to the objective lens plane 20, i.e. with respect to the reference optical element 148 positioned at or proximate to the sample plane. Thereafter, the alignment telescope is positioned at the imaging output port 32 for directing an alignment test beam along the imaging path 16 for reflection by the planar mirror 148 back to the imaging path output port 32. This output port positioning of the alignment telescope provides for alignment of the imaging optical elements with respect to the planar mirror 148, which would remain positioned at or proximate the sample plane 22.

At any time before, during or after the alignment procedure, the objective lens 18 may be inserted into the objective lens port 110, such as by threading or in any known manner as is known in the art. Insertion can be accomplished, for example, via opening 144. This allows for adjustment, e.g. tilt, centration, etc., of the objective lens with respect to the same target alignment element position used for aligning the illumination and imaging optical components, namely, the planar mirror 148 positioned at optical mounts 140$_A$. Once alignment is complete, the fixture 100 can be easily detached from the microscope objective lens plane 20 such as by disengaging the fixture threading from complementary threading on the sample plane or by releasing the thumb screws 104 (shown in FIG. 3). The microscope 10 is then ready to be used in its intended manner by positioning a sample on the sample plane 22.

Rather than the planar mirror 148, other types of optical reference elements can be used in the fixture 100 to provide alignment for microscope optical components. For example, planar mirror 148 may be replaced with a spherical mirror 142 (positioned at a selected mount location, e.g., 140$_B$ on the fixture 100) for interferometric or wavefront analysis. When the spherical mirror is used, an interferometer or wave front analyzer is used instead of the alignment telescope. Transmissive reticle 143 mounted at 140$_C$ may also be used for measuring the projection of light through the microscope components. In this latter use it will be recognized that as test light will not be reflected by the transmissive reticle 143, an alignment telescope test beam will not be required. Rather, an alignment detector such as an alignment telescope 29 will be positioned at either or both of the illumination path input port 28 and imaging path output port 32. A test light will then be provided through the transmissive reticle 143 in a direction toward the alignment telescope. In other words, the test light will be directed from the reticle up through the objective lens port and toward the illumination and imaging paths. The alignment telescope uses the test light beam as a guide or reference for optical component alignment.

The inventive fixture 100 allows for the alignment of the illumination path optical components, the imaging path optical components and the objective lens relative to a single location of a reference alignment element, such as the planar mirror 148 positioned proximate the sample plane 22 of the microscope. This reduces, and in some instances avoids, the need to fine-tune or otherwise readjust the alignment of the optical components after the initial sequence of the above-described alignment step has been completed. Also, the fixture 100 allows alignment of the optical components to be accomplished, if desired, with the objective lens 18 in place in the objective lens port 38. Thus, and as should be appreciated, the alignment accuracy of the microscope optical components is greatly improved. Moreover, assembly and set-up time for a microscope is significantly reduced through use of the fixture 100.

Figure 4:
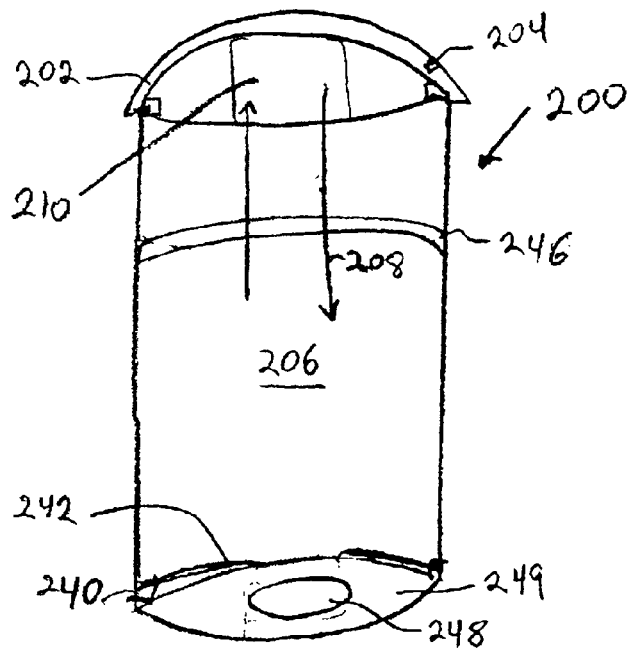
FIG. 4 depicts a perspective view of yet another embodiment of the invention.

Instead of a substantially enclosed fixture as shown in FIG. 3, the fixture can consist of a mostly open structure, such as a "C-shaped" fixture 200 depicted in FIG. 4, wherein the fixture is illustrated as if viewed looking inward through the opening 144 of FIG. 3. In this embodiment, the fixture has a flat, arcuate-shaped base 202 with an opening 210 for seating about the objective lens port 38 of the microscope 10. Thumb screws 204 or other securing means attaches the fixture to the microscope objective lens plane 20. A curved wall 206 connects or is otherwise attached or molded to the base 202 and extends, when the fixture 200 is in place about the objective lens port, toward the microscope sample plane 22. One or more optical element mounts are provided on an inside of the wall to facilitate removable attachment of reference optics 242. The mounts may be supports or clips 240, shown in the figure as positioned proximate the wall distal end, or rail-type supports 246 shown positioned along a length of the wall 206. FIG. 4 shows optical path 208, reference optical element 248, and edge 249 of element 248 which correspond, respectively, to features 108, 148 and 149 described above in connection with FIG. 3.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A fixture for use in the alignment of optical components of a microscope having an objective lens plane, an objective lens port and a sample plane distally spaced from the objective lens plane, said fixture comprising:

a base defining a mounting region for mounting the fixture to the objective lens plane at the objective lens port, said base having an optical port for receiving light from the microscope through the objective lens port and for passing light to the microscope through the objective lens port;

a side wall connected to said base and extending away from said base toward the sample plane when said fixture is mounted to the objective lens plane; and a reference optical element mount positioned on an inner side of said side wall for releasably securing a reference optical element to receive light from the objective lens port and to reflect the received light back to the objective lens port, so that when said fixture is mounted to the objective lens plane, the reflected light is used to align optical components of the microscope.

2. The fixture of claim 1, wherein said base comprises means for releasably securing said base to the objective lens plane of the microscope.

3. The fixture of claim 1, wherein said side wall has a distal end positioned proximate the microscope sample plane.

4. The fixture of claim 1, wherein said reference optical element mount is positioned at a distal end of said side wall.

5. The fixture of claim 1, wherein said reference optical element mount comprises a plurality of optical mounts spaced along said side wall between a distal end of said side wall and said base.

6. The fixture of claim 1, wherein said side wall has an opening and wherein said base and said side wall form a housing having an interior, said interior being accessible through said opening to provide access to said reference optical element mount.

7. The fixture of claim 1, wherein said side wall is curved.

8. The fixture of claim 1, wherein the reference optical element comprises a planar mirror.

9. The fixture of claim 1, wherein the reference optical element comprises one of a planar mirror and a spherical mirror.

10. A method of aligning optical components in a microscope having an illumination port, an imaging port, and an objective lens port, comprising the steps of:

positioning a fixture at the objective lens port of the microscope, said fixture having a base for releasable attachment of said fixture to an objective lens plane containing the objective lens port, and a side wall connected to and extending away from the base and away from the objective lens plane;

positioning an alignment beam source for generating an alignment beam at one of the microscope illumination port and microscope imaging port for passing the alignment beam through the microscope objective lens port and into said fixture;

disposing a reference optical element in said fixture and within a path of the alignment beam for reflecting the alignment beam toward said alignment beam source; and aligning optical components in the microscope relative to the reflected alignment beam.

11. The method of claim 10, wherein said disposing step comprises the step of disposing said reference optical element at a distal end of said side wall.

12. The method of claim 11, wherein said disposing step further comprises releasably attaching a periphery of said reference optical element to said fixture.

13. The method of claim 10, further comprising the step of positioning the alignment beam source at the other of the illumination port and the imaging port so that the alignment beam is reflected by said reference optical element to said alignment beam source.

14. The method of claim 10, further comprising the step of attaching an objective lens to said objective lens port and adjusting the objective lens relative to said reference optical element.

15. The method of claim 10, wherein said reference optical element comprises one of a planar mirror and a spherical mirror.

16. The method of claim 10, wherein said disposing step comprises releasably attaching said reference optical element to said fixture.

17. The method of claim 16, wherein said releasably attaching step comprises attaching said reference optical element to any one from among a plurality of positions along a length of said side wall.

18. The method of claim 10, wherein said alignment beam source comprises one of an alignment telescope, an interferometer, and a wave front analyzer.

19. A method of aligning optical components in a microscope having an illumination port, an imaging port, and an objective lens port, comprising the steps of:

positioning a fixture at the objective lens port of the microscope, said fixture having a base for releasable attachment of said fixture to an objective lens plane containing the objective lens port, and a side wall connected to and extending away from the base and away from the objective lens plane;

positioning an alignment detector at one of the microscope illumination port and microscope imaging port for receiving a test light from said fixture;

disposing a transmissive reference optical element in said fixture and within a path of the test light for passing the test light through the objective lens port toward said alignment detector; and aligning optical components in the microscope relative to the test light transmitted through the objective lens port.

20. The method of claim 19, wherein said transmissive optical element comprises a transmissive reticle.

21. The method of claim 19, further comprising the step of attaching an objective lens to said objective lens port and adjusting the objective lens relative to said reference optical element.

22. The method of claim 19, wherein said disposing step comprises releasably attaching said reference optical element to said fixture.

* * * * *